United States Patent [19]
Lindstrom

[11] 3,789,725
[45] Feb. 5, 1974

[54] SELF-DRILLING AND SELF-TAPPING FASTENER AND METHOD OF MANUFACTURE THEREOF

[76] Inventor: Bert A. Lindstrom, 1311 Williamsburg Rd., Rockford, Ill. 61107

[22] Filed: Oct. 6, 1971

[21] Appl. No.: 186,928

[52] U.S. Cl. ............................ 85/47, 10/27 R
[51] Int. Cl. ............................. F16b 25/00
[58] Field of Search ....................... 85/47, 41

[56] References Cited
UNITED STATES PATENTS

| | | | |
|---|---|---|---|
| 3,395,603 | 8/1968 | Skierski | 85/47 |
| 3,125,923 | 3/1964 | Hanneman | 85/47 |
| 2,738,698 | 3/1956 | Poupitch | 85/47 |

Primary Examiner—Edward C. Allen
Attorney, Agent, or Firm—Neuman, Williams, Anderson & Olson

[57] ABSTRACT

This improved non-walking, non-skittering self-drilling and self-tapping screw fastener is manufactured by a simplified, versatile method comprising pointing and fluting steps involving axial movement of end mill cutters. The resulting threaded fastener features a pair of oppositely-disposed, substantially longitudinally extending milled flutes at the entering end, each of the flutes having a uniformly-concavely-curved flute side including the cutting edge, a plane tangent to the concavely curved surface at the cutting edge extremity being inclined at an angle to and traversing the axis of the screw at an intermediate point of the shank. In a preferred embodiment having enhanced chip-breaking characteristics, the curvature and disposition of the flutes are such that they redirect the normal chip flow and thereby fragment the chips by flexure.

5 Claims, 23 Drawing Figures

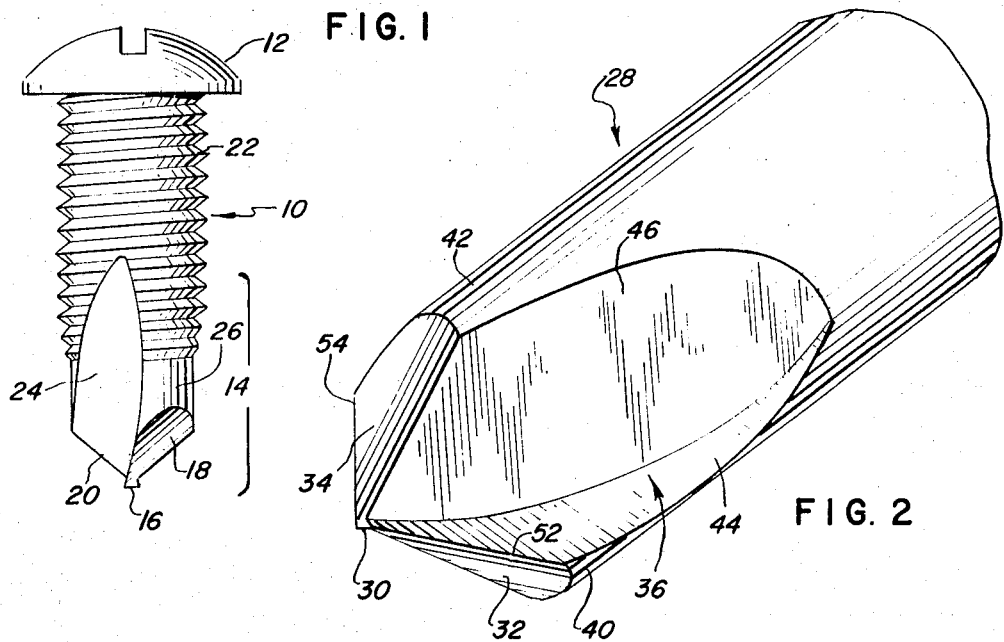
FIG. 1
FIG. 2
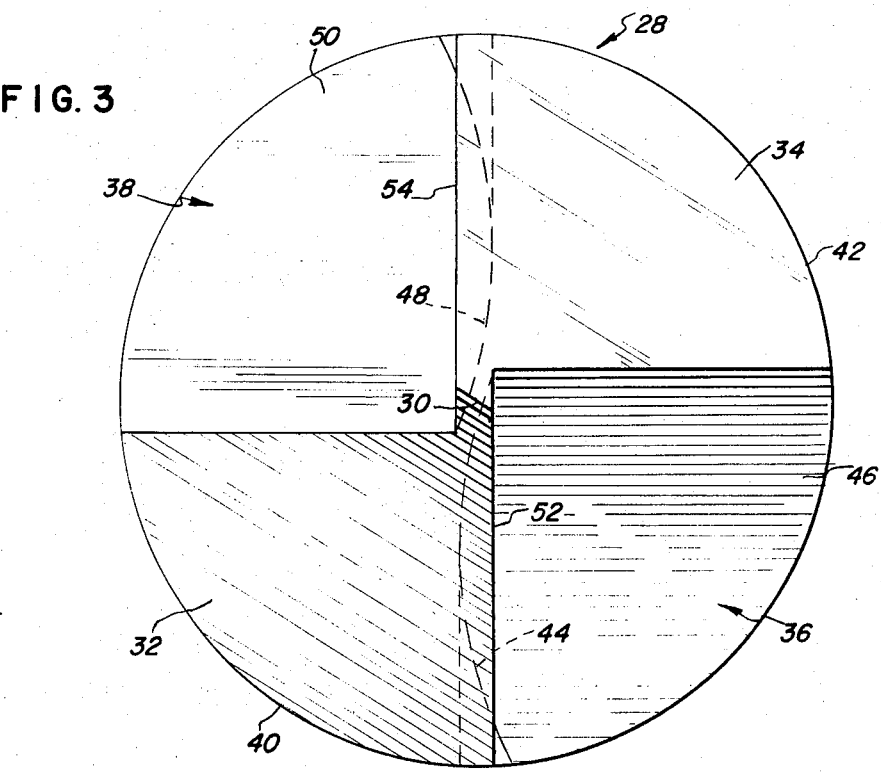
FIG. 3

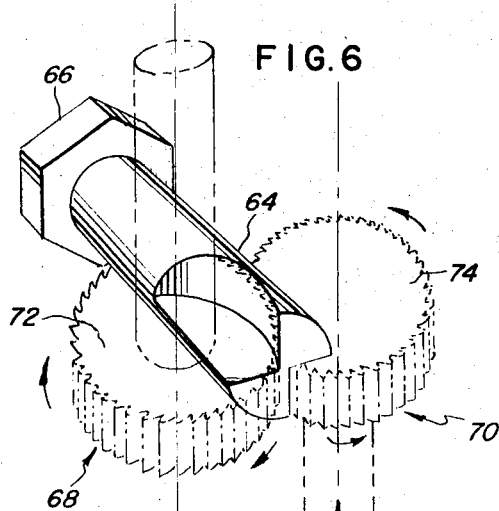
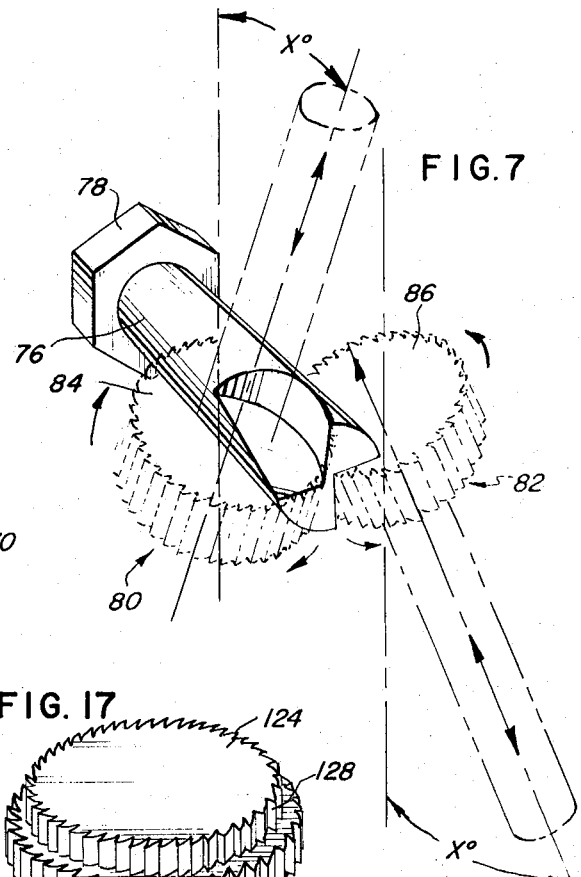
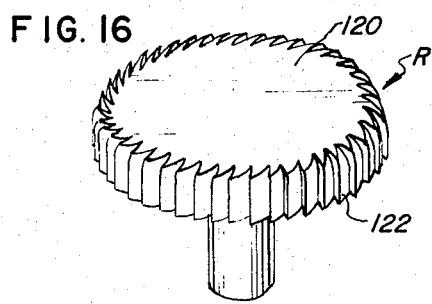
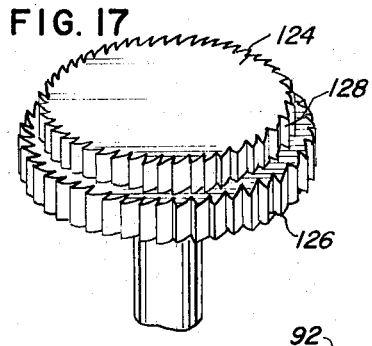
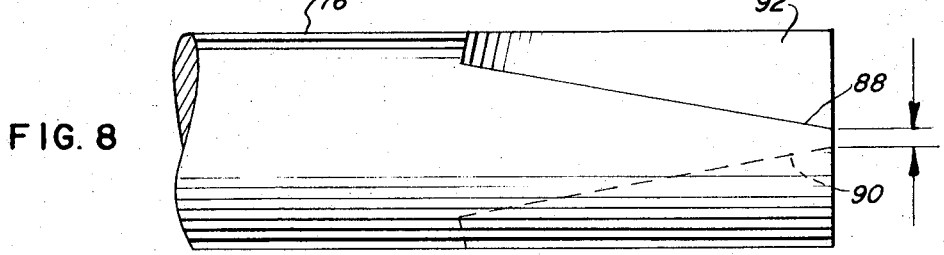
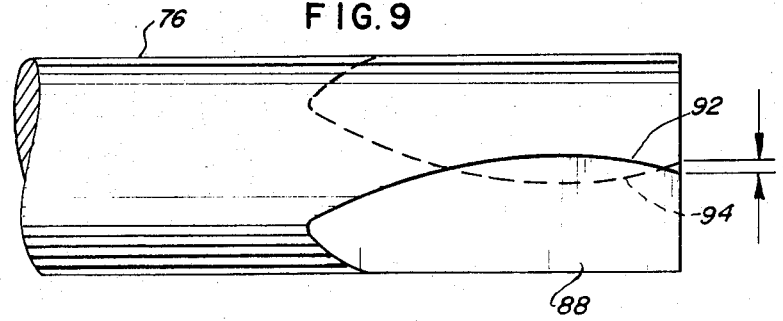

PATENTED FEB 5 1974 3,789,725

SELF-DRILLING AND SELF-TAPPING FASTENER AND METHOD OF MANUFACTURE THEREOF

BACKGROUND OF THE INVENTION

1. Field of the Invention

This invention relates to an improved self-drilling and self-tapping fastener and a novel method of preparing it. More specifically, it relates to an improved method of making a self-drilling and self-tapping threaded fastener having flutes of unique configuration and disposition which are disposed relative to complementary structure of the fastener, as herein described, so as to produce a fastener having desired anti-walking and anti-skittering qualities, reduced drilling time and pressure requirements, and enhanced chip breaking properties.

While the present invention will be described with particular reference to certain advantageous embodiments, it should be understood that the invention is not limited thereto. The fastener design and method can also be readily adapted to produce various screw-type fasteners meeting various specific requirements, as those skilled in the art will recognize in the light of the present disclosure.

2. Description of the Prior Art

Self-drilling and self-tapping screws and methods of producing them have been proposed, particularly for specific purposes, for many years, as exemplified by the disclosures of such patents as U.S. Pat. Nos. 1,294,268, 2,388,482, 2,403,359, 2,479,730, 2,871,752 and 2,956,470. The assignee of the present invention and application has also been active in this field, as evidenced by a number of patents issued to it, i.e., U.S. Pat. Nos. 3,094,893, 3,094,894 and 3,094,895.

The interest in self-drilling and self-tapping fasteners has greatly increased in recent years, as reflected in many patents such as, for example, U.S. Pat. Nos. 3,044,341, 3,079,831, 3,125,923, 3,207,024, 3,238,836, 3,241,426, 3,288,015, 3,318,182, 3,395,603, 3,438,299, 3,463,045, 3,507,183, 3,517,851 and 3,578,762. Several of these prior art self-drilling and self-tapping screws have met with considerable commercial success, thus offering incentives for improved designs which may develop new applications and new markets or achieve a share of existing markets.

Any successful design must at the minimum take into consideration at least two vital factors. These are performance of the self-drilling and self-tapping fastener and the economic feasibility of producing and selling it profitably.

Fastener performance is reflected, for example, in the axial force or pressure and time required to drill and tap the hole and secure the fastener in place. The workman who must apply axial forces with an extended arm is immediately aware of these critical force-time interrelationships. Excessive force-time interrelationships also limit the maximum practical diameter of the fastener for many purposes.

Another important performance criterion is whether the fastener has an excessive tendency to "walk" or "skitter" when it is first rotated against the surface to be drilled and fastened, particularly when no centering indentation is present. Another important consideration is whether the fastener design can be readily tailored for various fastening requirements, including the drilling of metals of various hardnesses and thicknesses, the drilling of holes of various diameters, and the like.

Another factor is whether the fastener design can be readily adapted to provide desired chip breaking characteristics. A related factor is whether the fastener can cope with abnormal amounts of chips and whether it can rid itself of chips before they enter and befoul the threads.

The art is aware of structural features which enhance such performance characteristics, e.g., thin webs, short chisel edges, and the like. But prior art fasteners have necessitated severe compromises of optimum design in order to meet other requirements, e.g., adequate structural strength, ease of manufacture, and the like. For example, one commercial drill screw employs an undesirably long chisel edge so that the cutters employed in the manufacture thereof do not collide and the interflute webs are not unduly thin.

The economic feasibility of marketing a new fastener is determined by a number of factors such as, for example, whether the fastener design lends itself to simplified production techniques, the speed or rate at which the fastener can be produced, the complexity and thus capital investment for the production machinery and the like. The finest fastener from a performance standpoint has little value if it can't be produced and used at costs reasonably competitive with alternative fastening means. The interrelationship of performance and costs must, however, be considered in determining the overall cost of the fastening function.

The present invention provides both a low-cost, simplified method of manufacture and improved fastener performance along the lines above indicated, as more fully reflected in the following objects.

OBJECTS OF THE INVENTION

It is therefore a general object of the present invention to provide a low cost, simplified method of manufacturing a self-drilling, self-tapping fastener having improved performance characteristics. It is another general object to provide a fastener having a design which lends itself to high speed manufacture by relatively simple production techniques and non-complex production machinery. It is another general object to provide a self-drilling and self-tapping fastener having a geometry which does not require the compromise of optimum design for manufacturing convenience or expediency.

It is a specific object to provide a method of manufacturing a self-drilling and self-tapping fluted fastener, which method can be readily varied so as to produce fasteners for a variety of materials, including aluminum. It is another specific object to provide a method of producing a fluted fastener wherein the size, length, width, depth, angular relationships and disposition of the flutes can be readily varied. It is another specific object to provide a method for producing a fluted fastener wherein the pointing, fluting and optional deburring steps are carried out exclusively by milling techniques with attendant advantages.

It is another specific object to provide a self-drilling fastener which has little tendency to "walk" or "skitter." It is another specific object to provide a self-drilling and self-tapping screw requiring lower drilling forces or pressures. It is another specific object to provide a self-drilling and self-tapping screw having reduced drilling times.

It is another specific object to provide a self-drilling, self-tapping fluted screw which can be varied in configuration, particularly the length of the flute and the rake angle, without substantial changes in the method of producing it. It is another specific object to provide a self-drilling and self-tapping fastener having desirable chip breaking characteristics. It is still another specific object to provide a self-drilling and self-tapping screw which purges itself of chips which might otherwise enter and befoul the threads.

It is still another specific object to provide a fluted self-drilling and self-tapping screw having a relatively thin web and short chisel edge as well as adequate structural strength. It is still another specific object to provide a design for aself-drilling, self-tapping fastener which permits larger practical shank diameters for a given drilling force-drilling time relationship.

These and other objects of the present invention will become apparent as the detailed description proceeds.

SUMMARY OF THE INVENTION

These objects are achieved, in brief, by a fastener and method of making it, the fastener comprising an elongated threaded shank with means at one end for turning the fastener and a fluted entering end portion having a unique design and disposition. The unique design of the entering end portion is characterized by a pair of flutes, each having at least one curved side, at least a portion of which includes the cutting edge. The curved flute side adjacent the cutting edge is concavely curved, and a plane tangent thereto is inclined at an angle to and traverses the axis of the shank at an intermediate point, whereby a positive rake angle is assured.

The design and disposition of the flute is such that the cutting edges of the screw are disposed at an angle of about 10° to 80° to the chisel edge forming the tip, the rake angle at the cutting edge is about 5° to 25°, the web thickness is in the range of about 0.01 to 0.04 inch, and the included angle is in the range of about 90° to 150°. In particular embodiments having enhanced chip handling and chip breaking characteristics, the curved flute side including the cutting edge is sufficiently curved to redirect the normal chip flow and thereby to fragment the chips by flexure.

In the case of screw shanks having a diameter up to about 5/16-inch, the chip-breaking curvature is such that planes tangent to the concavely curved surface at the cutting edge and at the opposite extremity thereof intersect at an angle of at least about 20°, typically in the range of about 30° to 120°, preferably about 40° to 100°. In the preferred embodiment wherein the concavely-curved surface has a uniform or constant (circular) curvature, the angular relationships set forth above would also correspond to the angle between radii from the center of curvature to the respective points of curvature.

As is apparent from the geometry, the greater the diameter, the greater the angle of intersection to obtain the requisite flexure for fragmentation. The optimum curvature for given material, shank diameter and drilling conditions is best determined empirically and is well within the skill of the art in the light of the present disclosure.

It should be noted that in this embodiment having enhanced chip handling and chip breaking characteristics, the points of tangency of the planes at the respective extremities of the flute are on the same side of a plane through the axis of the shank. As a corollary, the curved flute side preferably would traverse such plane through the axis of the shank at two spaced locations.

In all embodiments adequate clearances are present, and shank portions intermediate the flutes provide sufficient strength and bearing surface for efficient drilling and thread forming action. These parameters and structural details and the disposition of the flutes in relation thereto are more fully explained in connection with the specific description set forth hereinafter.

The unique method of the present invention includes the steps of pointing, fluting and optionally deburring the entering edge by milling techniques, with unexpected advantages, particularly as reflected in enhanced performance characteristics. More specifically, the pointing and subsequent deburring operations are performed by disposing a rotating end mill cutter adjacent the entering end portion with the plane of a side face of the cutter disposed at an angle to the axis of the shank and axially moving the rotating cutter against the extremity of the entering end portion. The milling operation is repeated on the opposite side of the entering end portion.

The fluting operation is similarly carried out by disposing a rotating end mill cutter with a portion of the side face overlapping a longitudinal portion of the shank adjacent the entering end portion, preferably at an angle oblique to the axis of the shank. The rotating cutter is then axially moved against the shank, whereby the side face mills a flute having both a flat and curved surface, the latter intersecting the chisel edge, as more fully set forth hereinafter.

BRIEF DESCRIPTION OF THE DRAWINGS

The present invention will be more clearly understood from the following detailed description of a specific embodiment read in conjunction with the accompanying drawings, wherein:

FIG. 1 is an elevation view showing a screw incorporating features of the present invention;

FIG. 2 is an enlarged fragmentary perspective view showing the entering end portion of an unthreaded screw blank incorporating features of the present invention;

FIG. 3 is a bottom view on a still further enlarged scale of the entering end portion of the screw blank of FIG. 2;

FIG. 6 is a fragmentary perspective view diagrammatically illustrating the orientation of two end mill cutters when simultaneously milling opposed flutes of the present invention in a bolt blank;

FIG. 7 is similar to FIG. 6 except that the axis of the two end mill cutters has been changed angularly so as to vary the configuration of the flutes;

FIG. 8 is a side view of a bolt blank on an enlarged scale illustrating the disposition of the flutes milled as illustrated in FIG. 7;

FIG. 9 is similar to FIG. 8 except that the bolt blank has been rotated 90° axially;

FIGS. 16 and 17 are fragmentary perspective views of end mill cutters having specialized shapes which may be employed in practicing the present invention.

Figure 4:
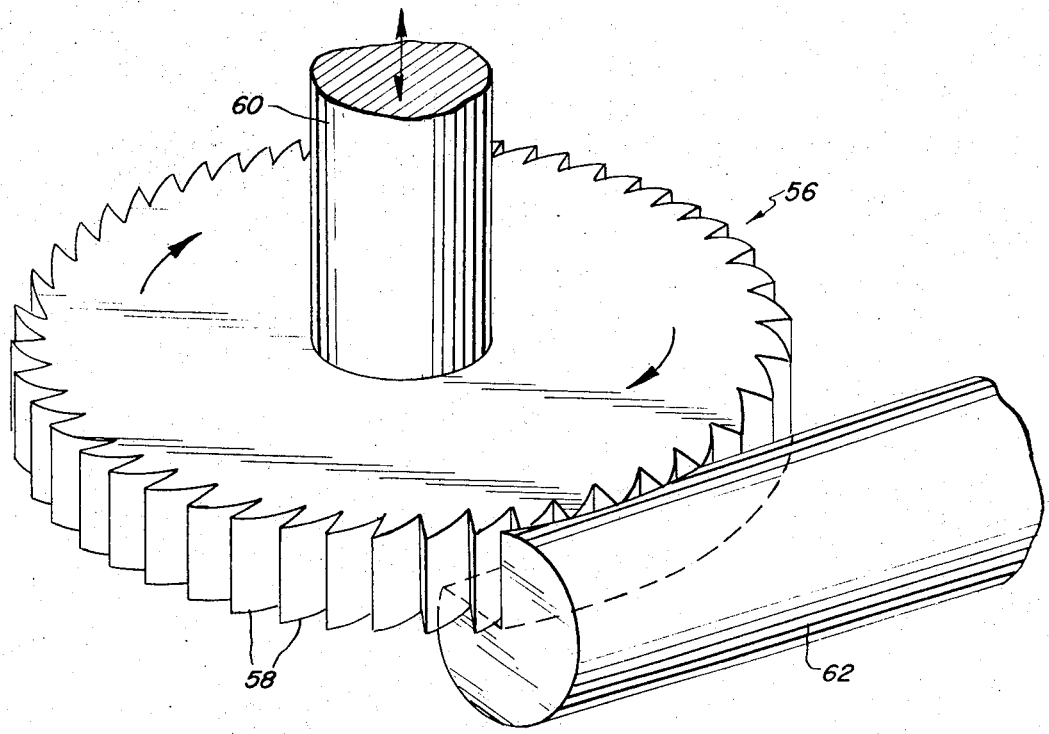
FIG. 4 is a fragmentary perspective view illustrating how a flute of the present invention is formed on a screw blank by means of an end mill cutter.

It should be understood that the drawings are not necessarily to scale and that graphic symbols and diagrammatic representations are sometimes employed. In certain instances, details which are not necessary for an understanding of the present invention may have been omitted. Thus, the drawings may depart in certain respects from appearances when visually observed. It should also be understood that the invention is not necessarily limited to the particular embodiments illustrated herein.

DETAILED DESCRIPTION OF THE DRAWINGS INCLUDING PREFERRED EMBODIMENT

Referring to FIG. 1, the self-drilling and self-tapping screw of the present invention comprises elongated shank 10 having a slotted head 12 of conventional design and an entering end portion generally indicated at 14. The entering end portion 14 includes a tip having a centered terminal chisel edge 16, which is substantially perpendicular to the longitudinal axis of the shank, and a pair of symmetrically disposed flat side surfaces 18 and 20 (hidden except for the edge) on each side of chisel edge 16 so as to diverge angularly outwardly and intersect the shank periphery.

The trailing portion of shank 10 is threaded, as indicated by thread 22, the length of the threaded portion and the thread configuration itself being a matter of choice, although interrelatable with the length of the flutes. The thread convolutions adjacent the entering end portion have a progressively increasing diameter. The greatest diameter is, of course, greater than the diameter of the entering end portion.

The shank includes a pair of oppositely disposed, substantially longitudinally extending identical milled flutes 24 with intermediate strengthening shank portions 26 between the flutes to provide sufficient bearing surface for efficient drilling and thread forming action. As set forth hereinafter, certain aspects of the design and disposition of the flute are critical to overall performance.

The drilling and thread forming screw may have a shank diameter of any desired size up to the practical limits dictated by the maximum tolerable drilling forces for a given set of conditions. Some prior art screws of the present type were often limited by such practical considerations to shank diameters of about 1/4 inch. It is expected that the greater drilling efficiency of the screw of the present invention would increase maximum shank diameters to as much as five-sixteenths to three-eighths inch under similar conditions.

Referring to FIGS. 2 and 3, fragmentary shank 28 has a centered chisel edge 30 formed by milling intersecting flat side surfaces 32 and 34 at the terminal end. The included angle between the intersecting flat side surfaces is in the range of about 90° to 150°, preferably 100° to 140°. As shown in FIG. 3, the angular relationship of the chisel edge and the cutting edges of the unique flutes of the present invention, as seen from a plane perpendicular to the axis of the drill, i.e., the "chisel edge angle," usually falls in the range of about 10° to 80°, preferably about 20° to 70°, e.g., about 60°, the optimum angle for a given drilling function being best determined empirically.

Screw shank 28 also includes elongated flutes 36 and 38 having opposed intermediate strengthening shank portions 40 and 42. Flutes 36 and 38 are defined by intersecting flute sides 44 and 46 and 48 and 50, respectively, flute sides 44 and 48 being concavely cured as further described herein. The intersection of flute sides 44 and 48 with the respective flat side surfaces 32 and 34 produces cutting edges 52 and 54, respectively.

In a preferred embodiment, flute side surfaces 44 and 48 are curved as sectors of a cylinder. Flute side 44 intersects flat side surfaces 32 and a portion of flat side surface 34 on opposite sides of chisel edge 30. Similarly, flute side 48 intersects flat side surface 34 and a portion of flat side surface 32 on opposite sides of chisel edge 30. As already indicated, the flutes are disposed so that the resulting cutting edges 52 and 54 are at an angle of about 10° to 80° to chisel edge 30.

In general, the web (the central portion of the drill body connecting the lands) should be as thin as possible, taking into consideration the need for adequate structural strength. The thinner the web, the faster the drill time. Webs substantially thinner than about 0.01 inch, however, may result in excessive point breakage. Webs thicker than about 0.04 inch may fail to drill.

As will be apparent from subsequent figures, planes tangent to concavely-curved surfaces 44 and 48 adjacent chisel edge 30 are inclined at an angle with respect to the longitudinal axis of the shank so as to traverse the axis at an acute angle intermediate chisel edge 30 and the head at the opposite end of the shank. This assures a positive rake angle, e.g., about 5° to 25°, preferably about 10° to 20°.

The milled flutes or slots of the present invention lend themselves to a simplified high-speed production method as described in greater detail in connection with FIGS. 18-23. For example, the flutes can be readily milled into a screw by use of a rotating end mill cutter. As illustrated in FIG. 4, such a cutter may comprise circular head 56 with end cutting teeth 58 and concentric shaft 60 for rotation. The end mill cutter straddles the blank 62 adjacent the end and, upon being rotated and reciprocated, cuts the significant drilling surfaces with the side wall of the cutter. This provides the desired rake angle.

Figure 5:
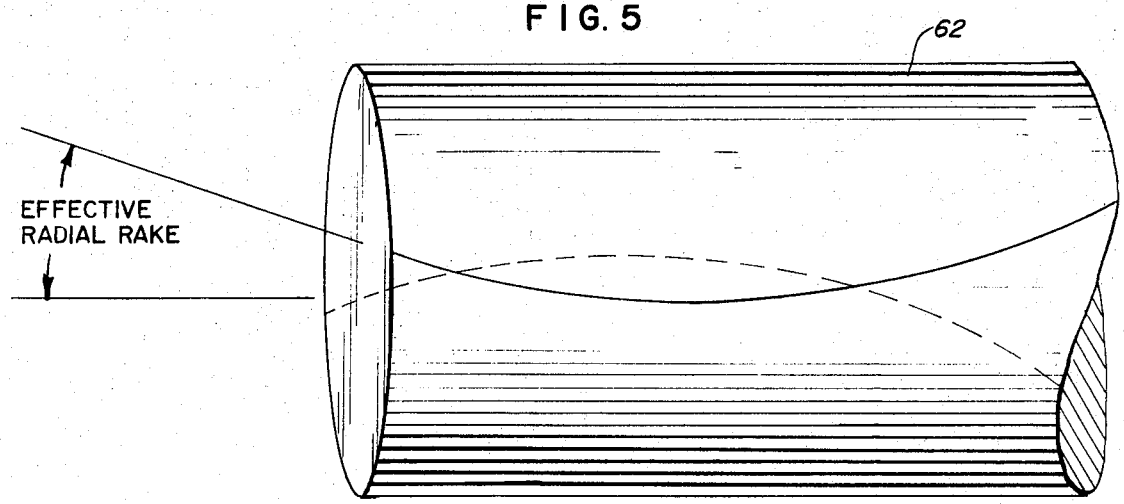
FIG. 5 is a fragmentary perspective view of one end of a screw blank illustrating the effective radial rake of the flutes of the present invention.

The resulting effective radial rake is illustrated diagrammatically in FIG. 5. The size, length and disposition of the flute can be readily adjusted by using different size cutters, by locating the axis of the cutter at different locations, and by tilting or otherwise adjusting the angular relationship of the axis relative to that of the screw blank, as will be apparent in considering FIGS. 6 and 7.

In FIG. 6 bolt blank 64 having hexagonal head 66 of conventional design is straddled on opposite offset sides by rotating end mill cutters 68 and 70 having parallel axes located in a plane perpendicular to the axis of the bolt blank. Upon controlled reciprocal movement of cutters 68 and 70 in opposed directions, cutter heads 72 and 74 mill the respective flutes in the shank as indicated. The flat sides of the flutes are, of course, parallel to each other and to the bolt axis.

In FIG. 7, which is similar to FIG. 6, bolt blank 76 having hexagonal head 78 is straddled on opposite offset sides by rotating end mill cutters 80 and 82. The axes of cutters 80 and 82 are angularly displaced or tilted forward from the position portrayed in FIG. 6 by the angle X°. Upon controlled reciprocal movement of cutters 80 and 82 in generally opposite directions, cutter heads 84 and 86 mill the respective slanted flutes in the shank as indicated.

In contrast to certain prior art techniques for producing self-drilling and self-tapping screws, there is little danger of the two cutters 80 and 82 colliding. This is apparent from a consideration of the geometry of FIGS. 8 and 9, which generally illustrate the disposition of the flutes milled as indicated in FIG. 7. The planes of flat flute sides 88 and 90 intersect forward of the blank extremity, while the concavely curved surfaces 92 and 94 spacedly overlap. The thinnest effective web is advantageously positioned where it is most practical — at the point tip, as indicated by the dimensional arrowheads adjacent the web.

Figure 10:
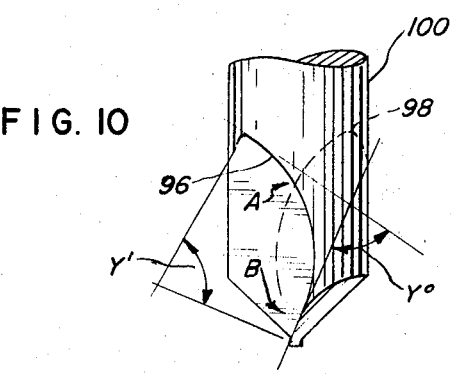
FIG. 10 is a fragmentary elevation view of a screw blank illustrating another embodiment of the flutes of the present invention having enhanced chip breaking characteristics, the threads being omitted for simplicity and clarity.
Figure 11:
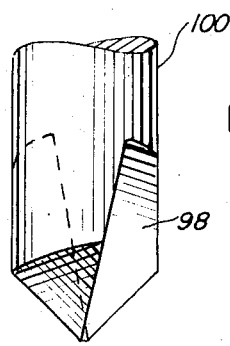
FIG. 11 is similar to FIG. 10 except that the blank has been rotated 90° axially.

An embodiment having enhanced chip-breaking characteristics is illustrated in FIGS. 10 and 11. In this embodiment, the curvature of the concavely curved surfaces 96 and 98 of the flutes in shank 100 is far more pronounced, resulting in sufficient flexure of the chips to assure fragmentation. This curvature is conveniently defined by the angle Y°, which is the angle between intersecting tangents drawn to the concavely curved surface adjacent the cutting edge and at the opposite or shank-existing extremity. In the preferred embodiment wherein the curvature is uniform, i.e., circular, the angle Y° is also the same as the angle Y' between radii drawn from the center of curvature to the respective points of tangency.

It will be noted that the points (or lines) of tangency to surface 96 in FIG. 10 are on the same side of a plane containing the axis of shank 100. Also, surface 96 intersects the plane of the axis at two points or lines, generally indicated by letters A and B.

As already indicated, angle Y° is best determined empirically for a given material, hole size and drilling conditions. For screw shanks up to about 5/16-inch diameter, it should be at least 20°. In the exemplar of FIGS. 10 and 11 it is approximately 80°.

Figure 12:
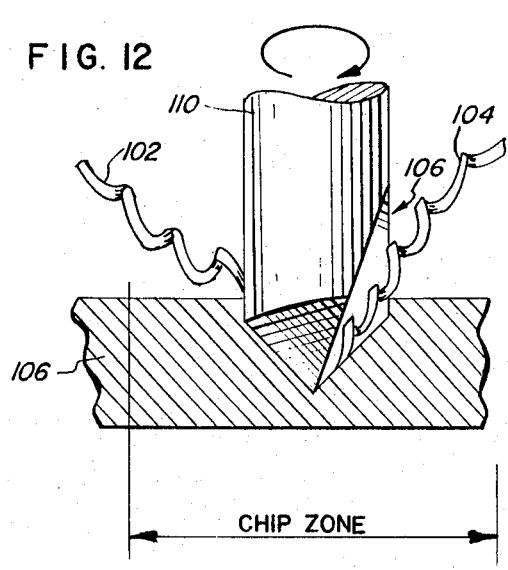
FIG. 12 is a fragmentary elevation view, partially in section, illustrating the entering end portion of a prior art self-drilling screw as it drills into a metal sheet, the threads being omitted for simplicity and clarity.
Figure 13:
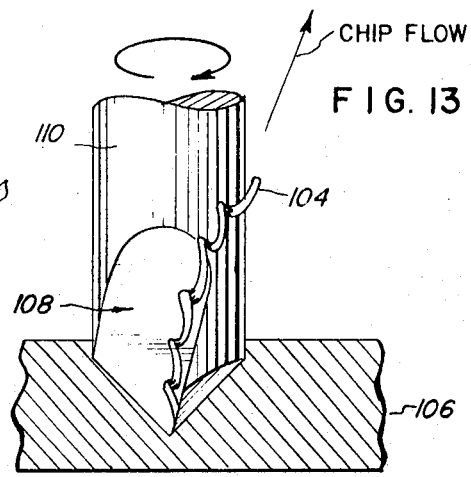
FIG. 13 is similar to FIG. 12 except that the screw blank has been rotated 90°.

Without the chip flexing and fragmenting characteristic of the embodiment of FIGS. 10 and 11, the chips tend to flow through and out of the flute almost vertically in a continuous spiral or string, as indicated by chips 102 and 104 from workpiece 106 in FIGS. 12 and 13. The flute 108 in shank 110 represents a prior art design, wherein the continuous chip strings may clog threads, foul the chip zone, interfere with the seating of the washer or screw head and otherwise create a hazardous and undesirable condition.

Figure 14:
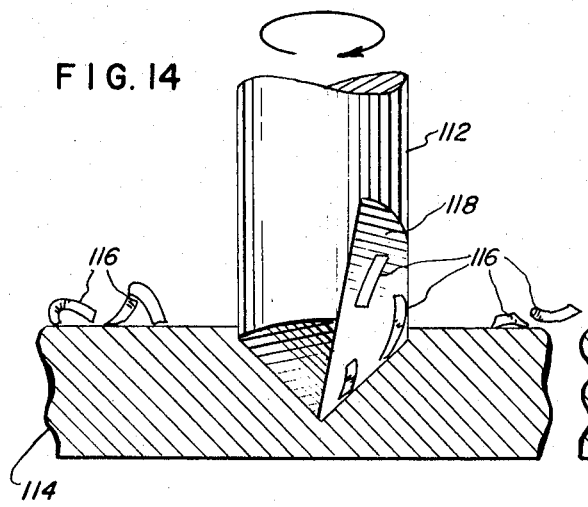
FIG. 14 is a fragmentary elevation view, partially in section, illustrating how the entering end portion of an embodiment similar to that of FIGS. 10 and 11 fragments and forwardly disposes of the chips as it drills into a metal sheet, the threads being omitted for simplicity and clarity.
Figure 15:
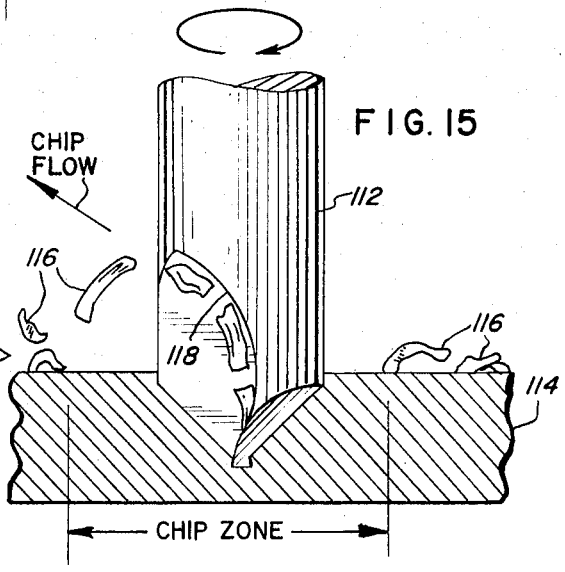
FIG. 15 is similar to FIG. 14 except that the screw blank has been rotated 90°.

Contrast the condition portrayed in FIGS. 12 and 13 with that illustrated in FIGS. 14 and 15, wherein the drilling point incorporates features of the present invention. When shank 112 is rotated into workpiece 114, the chips are propelled forwardly and outwardly and are fragmented by flexure due to the concave curvature of flute side 118, which redirects the chip flow. The chip velocity approaches the surface speed of the drill screw, and the resulting fragmented chips fall away from shank 112 whereby the chip zone is relatively clear. Manifestly, the small size of the chips preclude any tendency to wrap themselves around the rotating shank and foul the threads.

The end mill cutters illustrated in FIGS. 16 and 17 illustrate the versatility of the method and structure of the present invention. In FIG. 16 the cutter 120 has curved teeth 122, the curvature being indicated by R. This results in flute walls which for certain materials and conditions may have enhanced chip breaking characteristics. In FIG. 17 the cutter 124 has a compound tooth structure 126 and 128 which may result in flute walls providing faster drilling speeds as well as enhanced chip breaking characteristics.

Figure 18:
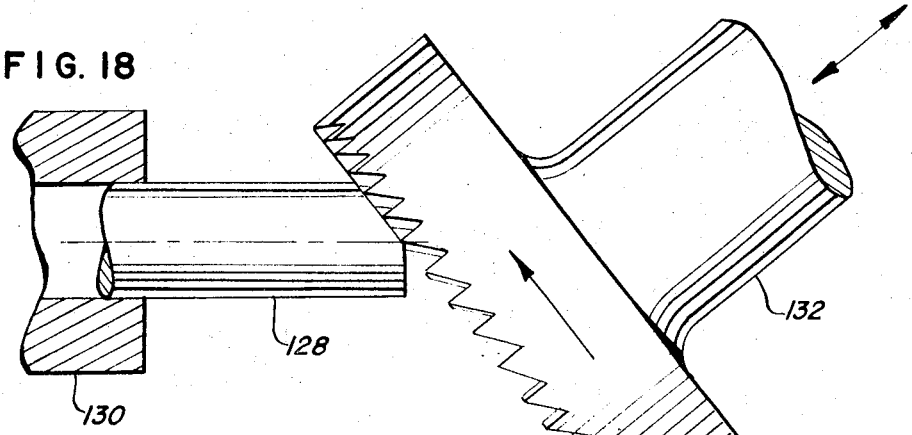
FIGS. 18-23 are fragmentary, diagrammatic views illustrating progressive steps in practicing a preferred embodiment of the method of the present invention.

Certain of the successive steps in the improved method of the present invention are illustrated diagrammatically in FIGS. 18 through 23, so as to produce an embodiment similar to that of FIGS. 10 and 11. The method is carried out by loading and locking a fastener shank 128 in a holder 130 with the entering end portion exposed. Rotating end mill cutter 132 is angularly disposed relative to the axis of shank 128 and moved thereagainst so as to mill a half point, as depicted in FIG. 18.

Figure 19:
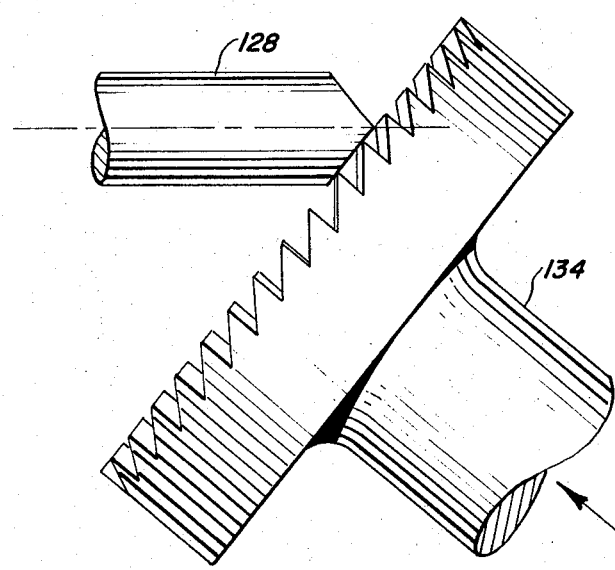

The same or similar cutter 134 is then angularly disposed relative to the axis of shank 128 on the opposite side, as indicated in FIG. 19. The previous step of milling a half point is then repeated to complete the point and to produce a centered chisel edge.

Figure 20:
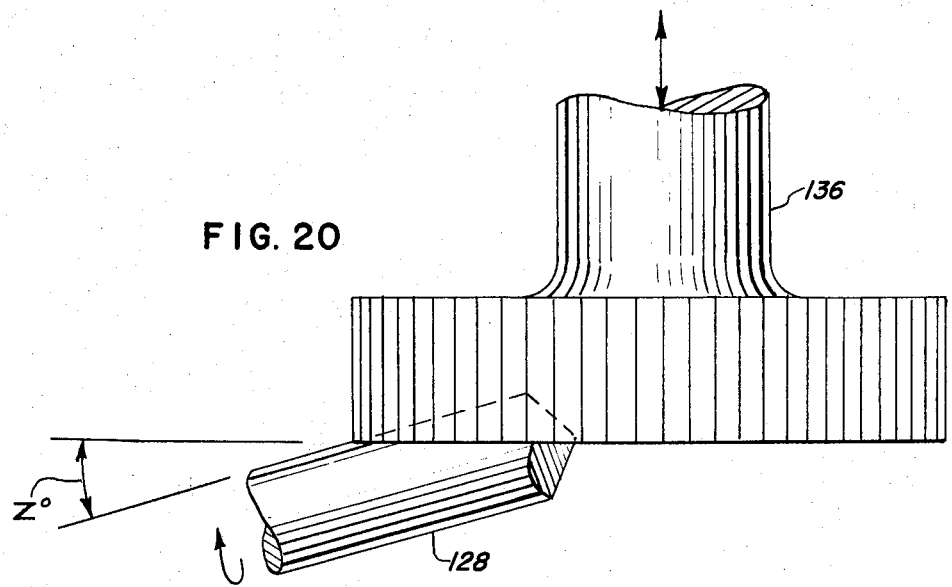

For the fluting operation, shank 128 is then rotated on its axis, e.g., about 10° to 80°, relative to the position depicted in FIG. 19, to produce the aforementioned chisel edge angle, and disposed relative to cutter 136, as indicated in FIG. 20. The angle Z° imparts the desired slant to the flat side of the flute, e.g., 5° to 50°, preferably 10° to 30°, relative to the axis of the shank.

Figure 21:
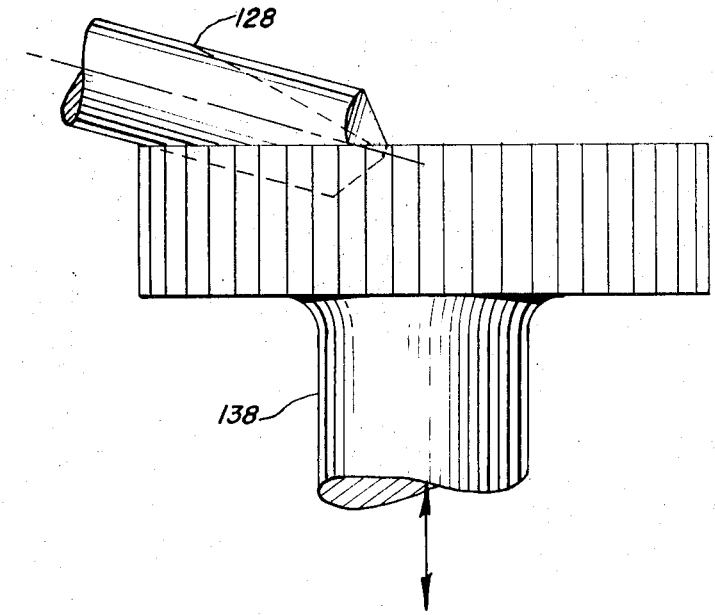

The fluting step depicted in FIG. 20 is repeated on the opposite side of the shank, as illustrated in FIG. 21. Screw shank 128 is angularly disposed so as to produce the same slant as on the opposed flute.

Figure 22:
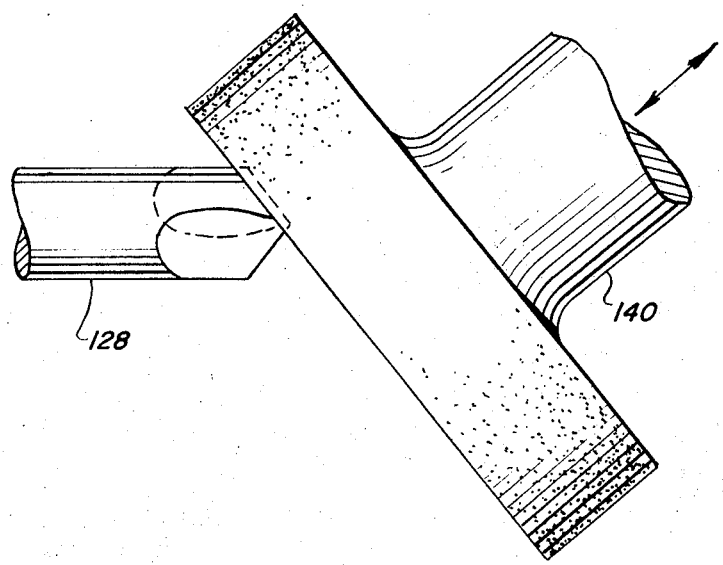
Figure 23:
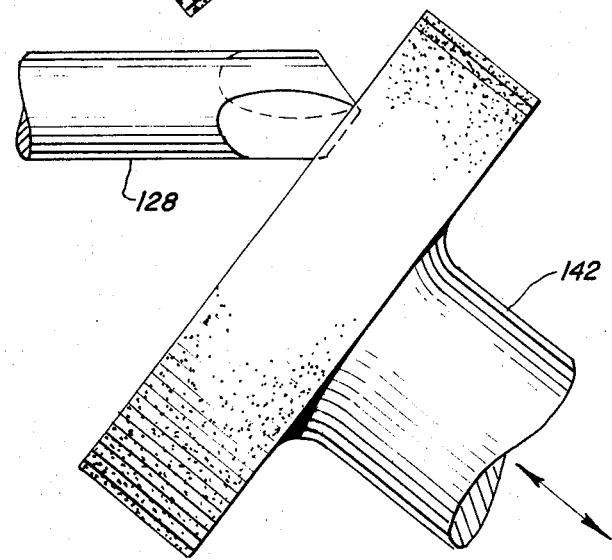

Upon completion of the fluting steps, shank 128 is again rotated and disposed relative to cutter 140 for the deburring operation, a illustrated in FIGS. 22 and 23. In this operation, the flat sides of the terminal point, previously produced as shown in FIGS. 18 and 19, are exposed successively to rotating cutter 140 (FIG. 22) and then 142 (FIG. 23). The cutters remove burrs from the point and otherwise sharpen the cutting edges. Upon completion of the deburring operation, screw shank 128 is then unloaded from the holder and threaded, as desired.

While successive steps were illustrated in FIGS. 18 through 23, it should be understood that certain of the steps may be carried out simultaneously, e.g., the fluting steps as depicted in FIG. 7. In addition, while the cutters in each of FIGS. 18–23 bore different reference numerals, it should be understood that the same cutter could be employed for more than one step, if desired.

It should also be understood that FIGS. 18–23 respectively indicate the relative position of the shank with respect to the cutter, and not necessarily the relative position from step to step. The shank may be moved successively to different cutters or different cutters may be moved successively to the shank, or combinations thereof. The order of the steps may also be varied. For example, the flank may be fluted first and then pointed. Alternatively, the shank may be half pointed and half fluted initially, and then the pointing and fluting operation may be completed.

As those skilled in the art will recognize, the present process lends itself to a multi-step machine wherein stations are rotated to the screw shank or the screw shank is rotated to a series of stations for each successive step. While only one holder 130 has been shown, it should be understood that the same or different holders may be used for successive steps.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. A drilling and thread forming screw comprising an elongated cylindrical shank and means at one end of said shank co-operable with a tool for turning the screw,
   a. said shank having at the other end thereof an entering end portion having a tip centered about the longitudinal axis of the screw and comprising a terminal chisel edge intersecting and substantially perpendicular to the longitudinal axis of the shank with a symmetrically disposed substantially flat side surface on each side of said terminal chisel edge, each diverging angularly outwardly and each intersecting the shank periphery intermediate the terminal chisel edge and said means for turning the screw,
   b. said shank including a trailing portion having a plurality of integral thread convolutions, the convolutions adjacent the entering end portion having a progressively increasing diameter, the greatest diameter of the thread convolutions being greater than the diameter of the entering end portion,
   c. said entering end portion having a pair of oppositely disposed substantially longitudinally extending milled flutes therein with intermediate strengthening shank portions between the flutes to provide sufficient bearing surface for efficient drilling and thread forming action,
   d. each of said flutes being defined by first and second intersecting flute sides, each of said first flute sides extending from the shank periphery adjacent said trailing portion into and beyond said terminal chisel edge, thereby intersecting the adjacent of said symmetrically disposed flat side surfaces and a portion of the other of said symmetrically flat side surfaces at opposite sides of said terminal chisel edge,
   e. the intersection of each of said first flute sides with the respective adjacent of said symmetrically disposed flat side surfaces providing a cutting edge disposed at an angle of about 10° to 80° to said terminal chisel edge,
   f. each of said first flute sides being uniformly concavely curved, a plane tangent to the uniformly concavely curved surface at the chisel edge being inclined at an angle with respect to the longitudinal axis of the shank so as to transverse the axis at an acute angle intermediate said chisel edge and said means for turning the screw, whereby to provide a positive rake angle at said cutting edge,
   g. the curvature of each of said first flute sides being sufficient whereby
      1. planes tangent thereto at the chisel edge and at the opposite or shank-exiting extremity intersect at an angle of about 40° to 100°,
      2. the points of tangency of the tangent planes are on the same side of a plane through the axis of the shank and the intersection of the tangent planes is on the opposite side, and
      3. the curved flute side and a plane through the axis of the shank traverse at two spaced locations, so as to redirect the normal chip flow and thereby to fragment the chips by flexure,
   h. said terminal chisel edge being disposed to initially engage and swage material from the workpiece and progressively expose the workpiece to said cutting edges and the thread convolutions.

2. The drilling and thread forming screw of claim 1 wherein said plane tangent to said uniformly concavely curved surface adjacent the cutting edge is inclined at an angle of between about 5° and 25° relative to the longitudinal axis of the shank.

3. The drilling and thread forming screw of claim 1 wherein said milled flutes extend into at least a portion of the shank having thread convolutions of progressively increasing diameter.

4. The drilling and thread forming screw of claim 1 wherein the thickness of the web as measured by separation of planes through the cutting edges of the respective flutes parallel to a plane containing the longitudinal axis of the shank is in the range of about 0.01 and 0.04 inch.

5. The drilling and thread forming screw of claim 1 wherein said flat side surfaces on each side of said terminal chisel edge intersect at an included angle of about 90° to 150°.

* * * * *

UNITED STATES PATENT OFFICE
CERTIFICATE OF CORRECTION

Patent No. 3,789,725          Dated February 5, 1974

Inventor(s) Bert A. Lindstrom

It is certified that error appears in the above-identified patent and that said Letters Patent are hereby corrected as shown below:

Title Page, between items [76] and [22], insert:
    [73] Assignee: Elco Industries, Inc.,
                       Rockford, Ill.

Column 1, line 41, change "3,517,851" to --3,517,581--;

Column 3, line 13, change "aself" to --a self--;

Column 6, line 25, change "cured" to --curved--;

Column 6, line 31, change "surfaces" to --surface--;

Column 6, line 58, after "screw" insert --shank--;

Column 7, line 46, change "existing" to --exiting--;

Column 10, line 18, change "transverse" to --traverse--.

Signed and sealed this 9th day of July 1974.

(SEAL)
Attest:

McCOY M. GIBSON, JR.
Attesting Officer

C. MARSHALL DANN
Commissioner of Patents